United States Patent [19]
Wang et al.

[11] Patent Number: 5,936,039
[45] Date of Patent: Aug. 10, 1999

[54] PROCESSES FOR PRODUCING THERMOPLASTIC ELASTOMERS HAVING IMPROVED ENGINEERING PERFORMANCE

[76] Inventors: Kang-Bo Wang, 263 Brookrun, Copley, Ohio 44321; Kuo-Shein Shen, 644 Olentangy Cir.; Krishna Venkataswamy, 3080 Ira Rd., both of Akron, Ohio 44333; Craig A. Chmielewski, 994 Countryside Dr., Medina, Ohio 44256

[21] Appl. No.: 08/967,057

[22] Filed: Nov. 10, 1997

[51] Int. Cl.$^6$ .............................. C08L 9/00; C08L 77/00
[52] U.S. Cl. ..................... 525/178; 525/133; 525/141; 525/198; 525/232; 525/240; 525/271
[58] Field of Search .................................. 525/232, 133, 525/271, 240, 141, 198, 178

[56] References Cited

U.S. PATENT DOCUMENTS

| | | | |
|---|---|---|---|
| 4,594,390 | 6/1986 | Abdou-Sabet et al. | 525/232 |
| 5,003,003 | 3/1991 | Olivier | 525/66 |
| 5,238,990 | 8/1993 | Yu et al. | 524/504 |
| 5,244,961 | 9/1993 | Yu et al. | 524/514 |
| 5,574,105 | 11/1996 | Venkataswamy | 525/179 |

FOREIGN PATENT DOCUMENTS

| | | |
|---|---|---|
| WO 92/02582 | 2/1992 | WIPO . |
| WO 95/26380 | 10/1995 | WIPO . |

OTHER PUBLICATIONS

*Engineered Materials Handbook*™ vol. 2, 'Engineering Plastics'—"Guide to Engineering Plastics Families: The Thermoplastic Resins", J.M. Margolis et al pp. 98–99, Nov. 1988.

*Primary Examiner*—P. Hampton-Hightower
*Attorney, Agent, or Firm*—Michael C. Pophal; William A. Skinner

[57] ABSTRACT

Processes for the preparation of a thermoplastic elastomer comprising a triblend of engineering resin, dynamically vulcanized alloy of thermoplastic olefin polymer and elastomeric copolymer, and a compatibilizer for the engineering resin and alloy. The compatibilizer can be formed in a separate step or in-situ in a one step process. The processes produce compositions which retain structural integrity at high temperature, and have good tensile properties, elongation and fluid resistance.

38 Claims, No Drawings

PROCESSES FOR PRODUCING THERMOPLASTIC ELASTOMERS HAVING IMPROVED ENGINEERING PERFORMANCE

TECHNICAL FIELD

This invention relates to processes for producing thermoplastic elastomers based on engineering thermoplastics, which have improved engineering and high temperature performance while retaining excellent elongation characteristics. A thermoplastic elastomer is generally defined as a polymer or blend of polymers that can be processed and recycled in the same way as conventional thermoplastic material, yet has properties and performance similar to that of vulcanized rubber at service temperatures. Blends or alloys of plastic and elastomeric rubber have become increasingly important in the production of high performance thermoplastic elastomers, particularly for the replacement of thermoset rubber in various applications.

BACKGROUND ART

Polymer blends which have a combination of both thermoplastic and elastic properties are generally obtained by combining a thermoplastic with an elastomeric composition in a way such that the elastomer is intimately and uniformly dispersed as a discrete particulate phase within a continuous phase of the thermoplastic. Early work with vulcanized compositions is found in U.S. Pat. No. 3,037,954 which discloses static vulcanization as well as a technique of dynamic vulcanization wherein a vulcanizable elastomer is dispersed in a resinous thermoplastic polymer. The elastomer is cured while continuously mixing and shearing the polymer blend. The resulting composition is a micro-gel dispersion of cured elastomer, such as butyl rubber, chlorinated butyl rubber, polybutadiene or polyisobutene in an uncured matrix of thermoplastic polymers such as polypropylene.

U.S. Pat. No. 5,003,003 is directed to blends of polyamide resin with elastomeric ethylene-propylene polymers which have been functionalized, then crosslinked after dispersion in the polyamide resin. The resulting blend has improved tensile strength, elongation and oil resistance.

U.S. Pat. No. 5,238,990 discloses a thermoplastic blend of polyamide with a grafted polymer which is a reaction product of: a) copolymers or halogen containing copolymers of a $C_{4-7}$ isomonoolefin and an alkylstyrene, and b) an unsaturated carboxylic acid or a derivative thereof. The blend is said to have improved impact strength while maintaining the high flexural modulus of the polyamide.

In U.S. Pat. No. 5,244,961, a process is described for the preparation of a blend of thermoplastic polyamide halogen containing copolymers of $C_{4-7}$ isomonoolefin and para-alkylstyrene, in the presence of a metal compound. The blend has improved low impact resistance at low temperatures.

PCT Published Application WO 95/26380 describes a process for producing a thermoplastic elastomer having improved service properties which incorporates copolymers of a functionalized polyolefin and a polyamide in a thermoplastic elastomer selected from: a) a thermoplastic polyolefinic copolymers, and a olefinic rubber which is fully crosslinked, partially crosslinked or not crosslinked, and optional additives; b) a block copolymers of styrene/conjugated diene/styrene and/or its hydrogenated derivative, optionally compounded with a thermoplastic polyolefinic homopolymer or copolymers and/or common additives; and c) any blend of a and b.

U.S. Pat. No. 4,594,390 describes a process for the preparation of thermoplastic elastomers comprising a blend of plastic and cured rubber by dynamic vulcanization wherein the blend is subjected to high shear in a mixer such as fully intermeshing and co-rotating twin screw extruder. All of the plastic and rubber and the other compounding ingredients, except a cure activator, are fed into the entry port of the extruder. In the first one third of the extruder, the composition is masticated to melt the plastic into an essentially homogenous blend. The cure activator is added to an entry port located about one-third of the length from the initial entry port. The last two-thirds of the extruder is regarded as a dynamic vulcanization zone.

U.S. Pat. No. 5,574,105 describes a thermoplastic elastomer comprising a tri-blend of engineering resin, dynamically vulcanized alloy of thermoplastic olefinic polymer and elastomeric copolymers, in the presence of a compatabilizer for the engineering resin and dynamically vulcanized alloy. The compositions retain their structural integrity at high temperatures and have good tensile elongation and fluid resistance properties.

DISCLOSURE OF INVENTION

The present invention is based on the discovery of a process that is novel and that produces, in a single piece of equipment, thermoplastic elastomer (TPE) compositions having excellent physical properties at elevated temperatures. These compositions are provided by vulcanizing a precure mixture of olefinic polymer and an olefinic elastomer to form a dynamically vulcanized alloy (DVA) and then blending: a) a thermoplastic engineering resin with; b) the DVA comprising the thermoplastic olefinic polymer and the olefinic elastomer having reactive cure sites, in the presence of a compatibilizer for the engineering resin and the DVA subsequent to the dynamic vulcanization of the olefinic elastomer. Alternatively the precured components of the DVA are blended with the engineering resin prior to the dynamic vulcanization step.

The present invention is also based on the discovery that the compatibilizer can be formed in-situ from the melt blending of a compatibilizer forming material and the engineering resin in the mixing vessel either before the vulcanization step, during the vulcanization step or after the vulcanization step.

These process steps produce a thermoplastic elastomer composition which retains its integrity at high temperatures and has good tensile properties, elongation and fluid resistance. These process steps also optimize the production process and allow for the production of softer thermoplastic elastomers.

DESCRIPTION OF THE PREFERRED EMBODIMENTS

Engineering Resin

The thermoplastic engineering resins used in the compositions of the invention are amorphous or semicrystalline materials, usually polar in nature, with a glass transition temperature (Tg) or melting point above about 150° C., preferably above about 200° C. They may be used singularly or in combination, and are selected from polyamides, polycarbonates, polyesters, polysulfones, polylactones, polyacetals, acrylonitrile-butadienestyrene (ABS) resins, polyphenylene oxide (PPO), polyphenylene sulfide (PPS), styreneacrylonitrile (SAN) resins, polyimides, styrene maleic anhydride (SMA) and aromatic polyketones. Preferred thermoplastic engineering resins are polyamides. The more preferred polyamides are nylon 6, nylon 6,6, nylon 11, nylon 12 and mixtures or copolymers thereof.

Suitable thermoplastic polyamides (nylons) include crystalline or resinous, high molecular weight solid polymers (including copolymers and terpolymers) having recurring amide units within the polymer chain. Polyamides may be prepared by polymerization of one or more epsilon lactams such as caprolactam, pyrrolidone, lauryllactam and aminoundecanoic lactam, or amino acid, or by condensation of dibasic acids and diamines. Both fiber-forming and molding grade nylons are suitable. Examples of such polyamides are polycaprolactam (nylon 6), polylauryllactam (nylon 12), polyhexamethylenedipamide (nylon 6,6), polyhexamethyleneazelamide (nylon 6,9), polyhexamethylenesebacamide (nylon 6,10), polyhexamethyleneisophthalamide (nylon 6,IP) and the condensation product of 11-aminoundecanoic acid (nylon 11). Additional examples of satisfactory polyamides (especially those having a softening point below 275° C.) are described in Kirk-Othmer, Encyclopedia of Chemical Technology, 3d edition, vol. 18, pages 406–409, and Encyclopedia of Polymer Science and Engineering, 2d edition, vol. 11, pages 445–450, the contents of which are incorporated herein by reference. Commercially available thermoplastic polyamides may be advantageously used in the practice of this invention, with linear crystalline polyamides having a softening point or melting point between 160° and 230° C. being preferred. The amount of engineering resin found to provide useful compositions is generally from about 10 to about 50 parts by weight, and more preferably from about 10 to about 40 parts by weight, based on the weight of the composition comprising engineering resin, DVA, and compatibilizer.

Dynamically Vulcanized Alloy

The DVA component of the composition comprises a thermoplastic olefinic polymer and an elastomer (rubber) which have been melt blended in the presence of a curative to dynamically vulcanize the elastomer. The resulting DVA is a polyolefin matrix having micron or submicron size elastomer particles dispersed therein. The elastomer is desirably at least partially cured (crosslinked) during the dynamic vulcanization, and preferably is fully or completely cured. However any degree of cure is compatible within the present invention.

As used in the specification and claims, the term "dynamic vulcanization" means a process wherein the elastomer is vulcanized or cured in the presence of the polyolefin under conditions of high shear and at a temperature above the melting point of the polyolefin. The elastomer is thus simultaneously crosslinked and is usually dispersed as fine particles within the polyolefin, although co-continuous phase morphologies or a mixture of discrete and co-continuous phase morphologies are also possible. Dynamic vulcanization is effected by mixing the components at elevated temperature in conventional mixing equipment such as roll mills, Banbury mixers, Brabender mixers, continuous mixers, mixing extruders and the like. The unique characteristic of dynamically cured compositions is that, notwithstanding the fact that the elastomer component is partially or fully cured, the compositions can be processed and reprocessed by conventional plastic processing techniques such as extrusion, injection molding, blow molding and compression molding. Scrap or flashing can be salvaged and reprocessed.

The terms "fully vulcanized" and "completely vulcanized" mean that the elastomer component to be vulcanized has been cured to a state in which the elastomeric properties of the crosslinked rubber are similar to those of the elastomer in its conventional vulcanized state, apart from the thermoplastic elastomer composition. The degree of cure can be described in terms of gel content or, conversely, extractable components. These descriptions are well known in the art, for example in U.S. Pat. Nos. 5,120,947 and 5,157,081, both of which are fully incorporated herein by this reference.

The amount of DVA found useful in the triblend compositions of the present invention is generally from about 90 to about 50 parts by weight, and more preferably from about 90 to about 60 parts by weight, based on the weight of the triblend composition.

In the present invention, the DVA component comprises one component of a triblend composition which also comprises an engineering resin and a compatibilizer. In a preferred embodiment of the triblend composition of the present invention the engineering resin and the polyolefin of the DVA comprise a co-continuous phase having micron or submicron size elastomer particles dispersed therein. The elastomer particles are encapsulated by the polyolefin of the DVA within the co-continuous phase.

Thermoplastic Olefin Polymer

Polyolefins suitable for use in the compositions of the invention include non-polar thermoplastic, crystalline or semi-crystalline polyolefin homopolymers and copolymers. They are prepared from monoolefin monomers having 2 to 6 carbon atoms, such as ethylene, propylene, 1-butene, isobutylene, 1-pentene and the like, with ethylene, propylene and mixtures thereof being preferred. The polyethylene can be low density, ultra-low density or high density material. The term polypropylene includes homopolymers of propylene as well as reactor copolymers of polypropylene which can contain about 1 to about 20 weight percent of ethylene or an $\alpha$-olefin comonomer of 4 to 16 carbon atoms, and mixtures thereof. The polypropylene can be isotactic or syndiotactic, usually having a narrow range of Tg. Commercially available polyolefins may be used in the practice of the invention.

The amount of polyolefin found to provide useful DVA compositions is generally from about 10 to about 90 weight percent, based on the weight of the polyolefin and elastomer. Preferably, the polyolefin content will range from about 10 to about 50 percent by weight.

Curable Elastomer

Elastomers suitable for use in the compositions of the invention are compatible with the thermoplastic olefin polymer and have reactive cure sites. Such cure sites can either be an integral part of the elastomer backbone or can be incorporated by the additional of functional groups. A preferred group of elastomers is that prepared from copolymers of $C_{4-7}$ isoolefins and para-alkylstyrene. These copolymers are more fully described in U.S. Pat. No. 5,162,445, the disclosure of which is incorporated herein by this reference. A particularly preferred elastomer species is represented by the halogenated copolymer of isobutylene and para-methylstyrene. Elastomers of ethylene-propylene (EPR) and poly(ethylene-co-propylene-co-diene), also known as EPDM rubber, have also been shown to perform well in the compositions, either alone or in combination with copolymers of isoolefins and para-alkylstyrene.

In the present invention, the preferred olefin elastomers are EPDM rubber, the halogenerated copolymer of isobutylene and para-methylstyrene and blends thereof. In the master batch of uncured DVA the elastomer component comprises 10 to about 90 weight percent, based on the weight of the polyolefin and the elastomer components. Preferably the elastomer content will range from about 90 to about 50 percent by weight.

Curing System

In the compositions of the invention, the elastomer component of the DVA will generally be at least partially vulcanized, or crosslinked. Those ordinarily skilled in the art will appreciate the appropriate quantities, types of cure systems and vulcanization conditions required to carry out the vulcanization of the rubber. The elastomer can be vulcanized using varying amounts of curative, varying temperatures and varying time of cure in order to obtain the optimum crosslinking desired. Any known cure system can be used, so long as it is suitable under the vulcanization conditions for the elastomer or combination of elastomers being used and is compatible with the thermoplastic polyolefin component of the DVA. These curatives include sulfur, sulfur donors, metal oxides, resin systems, maleimides, peroxide-based systems, high energy radiation and the like, both with and without accelerators and co-agents. Phenolic resin curatives are preferred for the preparation of the DVA compositions of the invention, and such cure systems are well known in the art and literature of vulcanization of elastomers. Their use in DVA compositions is more fully described in U.S. Pat. No. 4,311,628, the disclosure of which is fully incorporated herein by reference.

Compatibilizing Agent

In the preferred embodiment of the invention, the engineering resin and dynamically vulcanized alloy of the composition are combined in the presence of a compatibilizer for these components. The compatibilizer provides interfacial adhesion between the DVA and the engineering resin. Without the compatibilizer, blends of engineering resin and DVA have poor mechanical elongation properties, the weak interfaces between the components may fail and the components may delaminate. The compatibilizer is designed so that each segment or functional group is compatible with one of the major component phases, and incompatible with the other. For purposes of the specification and the claims, the compatibilizer is defined as a material which improves the interfacial adhesion of the major component phases in a thermoplastic elastomer composition by connecting the component phases, forming a stable blend.

The compatibilizer can be formed by the direct interaction of segments containing the functional groups present in the major components, i.e. the engineering resin and the DVA, or by interaction with another bi- or multi-functional compound. Compatibilizers are known in the art, e.g. in U.S. Pat. No. 4,455,545 and *Journal of Macro Molecular Science Chemistry*, A26(8), 1211 (1989). Where the engineering resin is a polyamide, the preferred compatibilizer includes the reaction product nylon and functionalized polypropylene which is prepared by melt mixing nylon (6) with polypropylene grafted with 0.1–2.0 weight percent maleic anhydride in the ratio of nylon:maleated polypropylene ranging from 95:5 to 50:50. See *Appl. Polym. Sci.*, 18, 963 (1974) and *Eur. Polym. J.*, 26, 131 (1990). The most preferred weight ratio of nylon:maleated polypropylene is about 80:20.

The compatibilizer may be present in the composition of the invention in the range of about 2 to about 35 parts by weight based on the engineering resin, DVA and compatibilizer. Preferably it is present in the range of about 2 to about 20 parts by weight.

As discussed above, the compatibilizer is prepared by the melt mixing of the engineering resin and a functionalized olefin. The functionalized olefin or a copolymer are compatibilizer forming materials that are selected for their compatibility with the particular DVA and reactivity with the end group of an engineering resin. In the above example, a maleated olefin is selected for its compatibility with an olefinic DVA and reactivity with the polyamide engineering resin. Other compatibilizer forming materials such as an epoxy group grafted to a polypropylene molecule or a oxazoline group grafted to a olefin would also be appropriate to form a compatibilizer for a polyamide and olefinic DVA blend. For purposes of this specification and the claims, a compatibilizer forming material is defined as a functionalized olefin or graft and/or block copolymer which acts to form a compatibilizer when grafted to an engineering resin.

In the prior art, e.g. U.S. Pat. No. 5,574,105 the compatibilizer is prepared in a vessel separate from the vessel in which the DVA was prepared or in which the DVA was blended with the engineering resin. In the prior art, the compatibilizer was prepared prior to its addition to the mixture comprising the DVA and the engineering resin. As described above, the present invention is based on the discovery that the compatibilizer can be formed in-situ by the reaction between a compatibilizer forming material and the engineering resin. The preferred ratio of compatibilizer forming material to engineering resin is a 1:1 molecular ratio. Because of the large engineering resin molecular weights the weight ratios of engineering resin to compatabilizer forming material is generally 4:1. The compatibilizer forming material can be added to a mixture prior to the vulcanization of the thermoplastic olefin polymer and the curable elastomer, or after the vulcanization of these components. When added the compatibilizer forming material grafts to the engineering resin to form a compatibilizer in-situ.

Additives

In addition to the engineering resin, DVA and compatibilizing agent, the compositions of the invention may also include reinforcing and non-reinforcing fillers, plasticizers for the engineering resin and polyolefin, antioxidants, stabilizers, rubber processing oil, extender oils, lubricants, antiblocking agents, antistatic agents, waxes, foaming agents, pigments, flame retardants and other processing aids known in the rubber compounding art. The additives can be added during the preparation of the DVA or the preparation of the finished composition or both, provided that the total amount of the additives does not exceed about 75 weight percent, preferably about 50 weight percent, more preferably 25 weight percent, based on the total thermoplastic elastomer composition, including additives.

Fillers and extenders which can be utilized include conventional inorganics such as calcium carbonate, clays, silica, talc, titanium dioxide, carbon black and the like. The rubber processing oils are generally paraffinic, napthenic or aromatic oils derived from petroleum fractions. The type will be that ordinarily used in conjunction with the specific elastomer or elastomers present in the DVA, and the quantity based on the total rubber content may range from zero to a few hundred parts per hundred parts rubber (phr).

Procedure

The discoveries of the present invention allow for the most preferred procedure with the thermoplastic elastomer having superior engineering performance being prepared in a one step process using a single piece of equipment, i.e., a twin screw extruder. Here the olefinic dynamic vulcanizate is made in an upstream portion of the extruder and the compatibilizer and suitable engineering resin are mixed in the extruder downstream, resulting in a TPE with continuous or co-continuous engineering plastic phase and having higher temperature performance. The discoveries of the present invention also allow for a wide range of flexibility in the steps which comprise the procedures of the present invention. Various steps of the procedures can be varied to allow for this wide range of flexibility. These steps include: whether one vessel or two vessels are used in the procedure; whether the compatibilizer is preformed or formed in-situ; whether the compatibilizer is added to the mixture before cure of the dynamic vulcanized alloy or after cure; and whether the DVA is created in a batch process or in a continuous process. Further variations on the procedures will become evident from the below described procedures and the examples.

The present invention allows for a one step or a two step procedure. In the one step procedure, the uncured components of the DVA are mixed and then dynamically vulcanized using an appropriate curing system in the initial portion of the continuous mixer. The engineering resin and the compatibilizer and introduced downstream and mixed with DVA to result in the final TPE. In the two step procedure two vessels are used, or two passes are made in a single vessel. In the first vessel the uncured components of the DVA can be mixed and alternatively vulcanized. The premixed or vulcanized materials are then fed into a second vessel or a second pass through the same vessel where they are then either subsequently vulcanized or then blended with the compatibilizer and the engineering resin.

The compatibilizer is prepared by melt mixing the components, the engineering resin and a compatibilizer forming material. This can be done either in-situ within the mixing vessel or in a separate preparation vessel. When the compatibilizer is prepared in a separate vessel the components, for example, nylon and maleated polypropylene, are melt mixed in a batch mixing vessel or a twin screw extender suitable for the volume of the compatibilizer required. When the compatibilizer is prepared in-situ the compatibilizer forming material is added to the mixing vessel preferably in a compatibilizer forming material to engineering resin 1:1 molecular ratio. Of course the weight ratio depends on the relative molecular weights of the engineering resin and the selective compatibilizer forming material. In the most preferred embodiment of the invention, in which a polyamide comprises the engineering resin and maleated polypropylene comprises the compatibilizer forming material, the weight ratio of engineering compatibilizer forming material ranges from 6:1 to 3:1 when the compatibilizer forming material is added prior to the vulcanization step. When the compatibilizer material is added post-vulcanization, the weight ratio of engineering resin to compatibilizer forming material ranges from 7.5:1 to 5:1.

The one step and the two step processes can also be modified by the timing of when the compatibilizer is added or formed within the process. The compatibilizer can be formed within the process or added thereto either before or after the vulcanization step. When the compatibilizer is formed within the process or added thereto before dynamic vulcanization a much softer thermoplastic elastomer results relative to the product of the process when the compatibilizer is formed within the process and added thereto after dynamic vulcanization has been completed.

Two Step Procedure

In the two step procedure two process vessels are used or two passes are made in a single vessel. The first process vessel is either a batch or a continuous mixing extruder vessel. The second vessel is preferably a twin screw extruder. In the below described examples the batch mixer is an internal mixer or internal Banbury type mixer. This mixer can be utilized to mix the uncured components of the DVA, or premix the uncured components and continue mixing while the mixture is being vulcanized. When the DVA is prepared within the batch mixer the thermoplastic olefinic polymer, the elastomeric copolymer, and a zinc oxide are added to the vessel at a temperature of about 165 Celsius. The speed of the rotor is in the range of 75 to about 100 rpm. After the components are well mixed and dispersed, curative is added to initiate the dynamic vulcanization. Mixing is continued to a maximum of mixing torque which indicates that vulcanization has occurred, usually between one and five minutes, and the speed of the rotor is increased to maximum mastication which is continued for an additional two to three minutes. The vulcanization composition is removed from the vessel and pelletized.

The mix of uncured components or the DVA are then added to a twin screw mixer. In the examples discussed below a fully intermeshing co-rotating twin screw extruder is used with L/D=42. Along with the mixed uncured components zinc oxide and a filler are added to the feed throat of the twin screw extruder and blended at high shear. If the uncured components were added to the extruder, phenolic resin curative and oil are added in downstream sections. In a barrel section further down (L/D=28), the engineering resin and compatibilizer are added along with magnesium oxide and antioxidation additive. Finally, a plasticizer is added to the extruder toward the end of the extruder.

The compatibilizer can be either premade or formed in-situ. Its entry into the twin screw extruder can be made either before cure or after cure.

When two continuous mixers are used in series or two passes are made in a single vessel, the procedure is similar to the above described batch then continuous, mixer procedures. In the most preferred procedure using two twin screw extruders or two passes are made on a single TPE, DVA is prepared in the first extruder or first pass and fed to the second extruder or second pass. The second extruder or second pass is then used to blend the DVA with the engineering resin and compatibilizer along with additional additives. Other combinations of mixers can be used in which the uncured components of the DVA are mixed, the uncured components are cured while being masticated to form a DVA which is then blended with the engineering resin in the presence of compatabilizer.

One Step Procedure

In the one step procedure the thermoplastic elastomers are preferably prepared in a twin screw extruder. In the one step procedure a premade compatibilizer can be added or prepared in-situ. The compatibilizer can be added either before cure of the precured DVA components or after cure.

In the most preferred one step procedure the uncured DVA components are added to the feed throat of a twin screw extruder. The components are mixed and a curative is added at a downstream barrel section (L/D=10.5) of the extruder to initiate the vulcanization of the components. After the components have been fully vulcanized the premade compatibilizer and engineering resin are added to the extruder. This most preferred embodiment of the invention results in a thermoplastic elastomer exhibiting superior engineering performance and physical qualities.

In an alternative embodiment of the one step procedure a blend containing EPDM olefinic elastomer and filler are added to the feed throat of an extruder along with proper amounts of a functionalized olefinic thermoplastic or another appropriate compatibilizer forming material. Additional nonfunctionalized olefinic thermoplastic may or may not also be added. Allowing for softening, melting and mastication of the materials, appropriate curatives for the cross linking elastomers are added in a downstream barrel section (L/D=10.5) along with an extender oil in a downstream barrel section (L/D=7). Finally, engineering resin and antioxidants are added near the end of the mixer in barrel section nine 40=31.5. The extruders throughput averages 200 to 300 pounds per hour at a screw speed of 350 rpm.

The following examples serve to illustrate, but not limit the present invention.

EXAMPLE 1

This example is a two step procedure and generally follows the two step procedure outlined above in which the uncured DVA components are mixed in a batch mixer and subsequently transferred to a twin screw extruder where they are vulcanized. In this example, dynamically vulcanized alloys of polypropylene and an elastomer comprising a mixture of brominated copolymer of isobutylene and paramethylstyrene and a EPDM rubber were prepared.

The rubber, the polypropylene, and the filler were melt mixed in a Banbury mixer at 75 rpm. The mix was masticated to achieve a homogeneous blend at a temperature in the range of 180 to 190° C. The blend was removed from the mixer and the uncured masterbatch was added to the inlet of a co-rotating twin screw extruder (L/D)=42). Extender oil and phenolic resin are added to the extruder at initial barrels (L/D=7.0 and L/D=10.5), and the vulcanization of the mixture begins. The engineering resin and the compatibilizer are added along with magnesium oxide at a downstream barrel (L/D=28). The engineering resin and DVA are blended in the presence of the compatibilizer to form the finished product. Finally plasticizer is added at a further downstream barrel section. The material was mixed at 350 rpm and fed through the extruder at 150 lb/hr.

Compositions A and B comprise a higher relative plastic composition relative to compositions C, D and E. Compositions D and E comprise a rubber mixture whereas compositions A–C are comprised of either the brominated copolymer or the EPDM. All of the compositions in this example comprise an 80:20 blend of preprepared compatibilizer comprising a 4:1 ratio of nylon (6) to maleated polypropylene. The physical properties were compared and set forth in Tables I and II. Concentrations of the components are in the proportions expressed in the Tables.

TABLE I

|  | A | B |
| --- | --- | --- |
| EPDM Rubber[1] | 100 | 0 |
| Bromo XP-50 Based Rubber[2] | 0 | 100 |
| Polypropylene | 40 | 40 |
| ZnO[3] | 2 | 2 |
| Carbon Black Concentrate[4] | 3 | 3 |
| TOTAL | 145 | 145 |
| Un-cured Masterbatch | 145 | 145 |
| Phenolic Resin[5] | 4 | 4 |
| Extender Oil[6] | 10 | 10 |
| Polyamide-6[7] | 40 | 40 |
| Compatibilizer[8] | 40 | 40 |

TABLE I-continued

|  |  | A | B |
| --- | --- | --- | --- |
|  | MgO Concentrate[9] | 4 | 4 |
|  | Plasticizer[10] | 15 | 15 |
|  | TOTAL | 258 | 258 |
| Properties | Hardness (Shore A/D) | 43D | 46D |
|  | UTS (MPa) | 19.2 | 19.5 |
|  | EB (%) | 355 | 305 |
|  | M100 (MPa) | 12.5 | 14.5 |
|  | Oil Swell (%, 24 hrs @ 121C) | 52 | 26 |

[1]Vistalon ®9500 EPDM (Exxon Chemical)
[2]EPDX ®89-1 (Exxon Chemical)
[3]Aristech PP D008M (Aristech Chemical)
[4]Ampacet 49974 (Ampacet)
[5]Schenectady SP-1045 (Schenectady)
[6]Sunpar 150M (Sun Oil)
[7]Nylon (6)Capron ®8202 (Allied Signal)
[8]80/20 interpolymer of Nylon (6), maleic anhydride modified polypropylene (Uniroyal Chemical Company)
[9]Maglite D Conc Americhem 26629-R2 (Americhem)
[10]Ketjenfex ®8 (Akzo Chemical)

TABLE II

|  |  | C | D | E |
| --- | --- | --- | --- | --- |
|  | EPDM Rubber | 100 | 75 | 50 |
|  | Bromo XP-50 Based Rubber | 0 | 25 | 50 |
|  | Polypropylene | 30 | 30 | 30 |
|  | Filler[1] | 10 | 10 | 10 |
|  | Carbon Black Concentrate | 5 | 5 | 5 |
|  | TOTAL | 145 | 145 | 145 |
|  | Un-Cured Masterbatch | 145 | 145 | 145 |
|  | Filler | 7 | 7 | 7 |
|  | Phenolic Resin | 6 | 6 | 6 |
|  | ZnO | 3 | 3 | 3 |
|  | Extender Oil | 15 | 15 | 15 |
|  | Polyamide-6 | 58 | 58 | 58 |
|  | Compatibilizer[2] | 58 | 58 | 58 |
|  | MgO Concentrate | 6 | 6 | 6 |
|  | Anti-Oxidant Concentrate[3] | 9 | 9 | 9 |
|  | Plasticizer | 22 | 22 | 22 |
|  | TOTAL | 329 | 329 | 329 |
| Properties | Hardness (Shore A/D) | 48D | 50D | 51D |
|  | UTS (MPa) | 19.4 | 24.2 | 24.2 |
|  | EB (%) | 298 | 266 | 281 |
|  | M100 (MPa) | 15.0 | 16.7 | 16.7 |
|  | Oil Swell (%,24 hrs @ 121C) | 29 | 15 | 19 |

[1]Icecap K Clay (Burgess Pigment Co.)
[2]80/20 interpolymer of Nylon (6) and maleic anhydride modified polypropylene (Uniroyal Chemical Company)
[3]Vanox MTI (R.T. Vanderbilt Co.) in Polypropylene As can be seen from the data in Table I and Table II the two step procedure of the present invention produces thermoplastic elastomer compositions which have a superior engineering performance.

Compositions A and B have high hardness because of their higher concentrations of plastic. Compositions A and C are less resistant to oil swell because of their high concentrations of EPDM rubber. The rubber mixtures compositions D and E show higher strength as shown in their tensile strength and modulus test results.

EXAMPLE 2

This example shows the most preferred procedure of the present invention. The compositions presented in Table III were prepared using the one step procedure outlined above. The elastomer composition was varied between 100% composition of EPDM and 100% composition of the brominated copolymer of isobutylene and paramethylstyrene. All other constituents and compositions remain constant. The compatibilizer was prepared before its introduction into the co-rotating twin screw extruder after vulcanization. The compatibilizer comprised 80% of a nylon 6 Capron®8202 (Allied Signal) and 20% maleated polypropylene, maleated polypropylene (Uniroyal Chemical Company). Specifically the elastomer mixture, the polypropylene, filler and zinc oxide are fed into the extruder at the first barrel section. Oil and phenolic resin are fed at initial barrel sections. The remaining components, i.e. engineering resin, compatibilizer, magnesium oxide and antioxidant, are fed downstream. The throughput rate is 150 lb/hr with a screw speed of 350 rpm.

TABLE III

|  |  | F | G | H |
|---|---|---|---|---|
|  | EPDM Rubber | 100 | 50 | 0 |
|  | Bromo XP-50 Based Rubber | 0 | 50 | 100 |
|  | Polypropylene | 30 | 30 | 30 |
|  | Filler | 12 | 12 | 12 |
|  | Phenolic Resin | 5 | 5 | 5 |
|  | ZnO | 2 | 2 | 2 |
|  | Extender Oil | 10 | 10 | 10 |
|  | Polyamide-6 | 40 | 40 | 40 |
|  | Compatibilizer[1] | 40 | 40 | 40 |
|  | MgO Concentrate | 4 | 4 | 4 |
|  | Anti-Oxidant Concentrate[2] | 6 | 6 | 6 |
|  | TOTAL | 249 | 249 | 249 |
| Properties | Hardness (Shore A/D) | 50D | 53D | 53D |
|  | UTS (MPa) | 18.1 | 19.5 | 17.8 |
|  | EB (%) | 320 | 218 | 168 |
|  | M100 (MPa) | 14.1 | 16.5 | 16.3 |
|  | Oil Swell (%, 24 hrs @ 121C) | 63 | 38 | 28 |

[1] 80/20 interpolymer of Nylon (6) and maleic anhydride modified polypropylene (Uniroyal Chemical Company)
[2] Vanox MTI/Naugard 445

This example shows that the one step procedure described in this example produces thermoplastic elastomer composition having superior engineering performance. The hardnesses of compositions F through H are relatively consistent with the similar compositions C through E in Table II. However, the tensile strength ultimate elongation and oil swell results varied from compositions C and D.

EXAMPLE 3

The compositions presented in Table IV were prepared generally following the one step procedure outlined above. In this example, the compatibilizers were prepared in-situ (as opposed to the pre-formed compatibilizers in the previous examples) with the compatibilizer forming material added after the dynamic vulcanization step. Compatibilizers consisting of interpolymers of nylon (6) and maleic anhydride modified polypropylene in different ratios were prepared in-situ and compared. The first seven components listed in Table IV were added to the first barrel section of a co-rotating twin screw extruder rotating at 350 rpm. After oil and phenolic resin were added at two upstream barrel sections (L/D=7 and L/D=10.5), engineering resin, magnesium oxide and anti-oxidant were added at barrel section L/D=31.5. The throughput rate of the mixture averaged 200 lb/hr.

The physical properties of the finished compositions were determined and are set forth in Table IV.

TABLE IV

|  |  | I | J |
|---|---|---|---|
|  | EPDM Rubber | 100 | 100 |
|  | Polypropylene | 16 | 12 |
|  | Black Concentrate | 4 | 3 |
|  | Filler | 10 | 10 |
|  | Processing Aid | 5 | 5 |
|  | Maleated Polypropylene | 10 | 15 |
|  | ZnO | 2 | 2 |
|  | Phenolic Resin | 5 | 5 |
|  | Extender Oil | 10 | 10 |
|  | Polyamide-6 | 75 | 75 |
|  | MgO Concentrate | 4 | 4 |
|  | Anti-Oxidant Concentrate | 3 | 3 |
|  | TOTAL | 244 | 244 |
| Properties | Hardness (Shore A/D) | 51D | 51D |
|  | UTS (MPa) | 18.4 | 19.0 |
|  | EB (%) | 288 | 294 |
|  | M100 (MPa) | 14.5 | 15.2 |
|  | Oil Swell (%, 24 hrs @ 121C) | 50 | 53 |

EXAMPLE 4

The compositions in Table V were prepared using the alternative embodiment of the one step procedure described above. The compatibilizers consisting of interpolymers of nylon (6) and maleic anhydride modified polypropylene at different ratios were prepared in-situ. The compositions K through N had the compatibilizer forming material added prior to the addition of the curing agent. The forming of the compatibilizer in-situ was performed prior to the onset of dynamic vulcanization. The first eight components are added to the inlet of the first barrel section. Oil and phenolic resin are added at two initial barrel sections. Finally anti-oxidants are added in barrel section L/D=28.0. The screw speed of the twelve barrel (L/D=42.0) co-rotating twin screw extruders was 350 rpm and the throughput rate of the mixture through the extruder was 150 lb/hr. The physical properties of the finished compositions were determined and are set forth in Table V.

TABLE V

|  |  | K | L | M | N |
|---|---|---|---|---|---|
|  | EPDM Rubber | 100 | 100 | 100 | 100 |
|  | Polypropylene | 0 | 0 | 5 | 5 |
|  | Filler | 12 | 12 | 12 | 12 |
|  | Phenolic Resin | 5 | 5 | 5 | 5 |
|  | Zn Stearate | 2 | 2 | 2 | 2 |
|  | Extender Oil | 20 | 20 | 20 | 20 |
|  | Polyamide-6 | 30 | 30 | 30 | 30 |
|  | Maleated Polypropylene | 5 | 10 | 5 | 10 |
|  | Anti-Oxidant Concentrates | 4 | 4 | 4 | 4 |
|  | TOTAL | 178 | 183 | 183 | 188 |
| Properties | Hardness (Shore A/D) | 69A | 76A | 75A | 83A |
|  | UTS (MPa) | 4.4 | 5.6 | 5.3 | 6.2 |
|  | EB (%) | 262 | 260 | 250 | 264 |
|  | M100 (MP) | 3.4 | 5 | 4.2 | 4.8 |
|  | Tension Set (%) | 20 | 38 | 28 | 31 |

The ultimate tensile strength of compositions K through N are markedly less than compositions I through J because of their lower hardness. The pre-vulcanization addition of compatibilizer forming material resulted in much softer thermoplastic elastomer compositions than the compositions I through J. However, this example illustrates that this variation of the one step procedures of the present invention produces thermoplastic elastomers with improved engineering performance.

The physical properties of the compositions of all these examples were determined according to the following methods: tensile strength, elongation, modulus 100% and tension set-ASTM D412; oil swell-ASTM D471; and shore D hardness ASTM D2240.

While the best mode and preferred embodiment of the invention had been set forth in accordance with the Patent Statutes, the scope of the invention is not limited thereto, but rather is defined by the claims which follow.

We claim:

1. A process for preparing a thermoplastic elastomer composition comprising the steps of:

feeding a thermoplastic olefinic polymer into a mixing vessel;

feeding an olefinic elastomer having reactive cure sites into said mixing vessel;

dynamically vulcanizing the contents of said mixing vessel to form a dynamically vulcanized alloy;

masticating the contents of said mixing vessel at a high shear rate during said vulcanizing step;

feeding an engineering resin into said mixing vessel; and feeding a compatibilizer forming material into said mixing vessel.

2. The process of claim 1 further comprising the steps of: forming a compatibilizer in said mixing vessel when said compatibilizer forming material is mixed with said engineering resin.

3. The process of claim 1 wherein said feeding a compatibilizer forming material step is performed after said dynamically vulcanizing step.

4. The process of claim 1 wherein said feeding a compatibilizer forming material is performed before said dynamically vulcanizing step.

5. The process of claim 1 wherein the ratio by weight of engineering resin to compatibilizer forming material ranges from about 95:5 to about 5:95.

6. The process of claim 5 wherein the ratio by weight of engineering resin to compatibilizer forming material is about 80:20.

7. The process of claim 1 wherein said compatibilizer forming material comprises a maleated olefinic polymer.

8. The process of claim 1 wherein said mixing vessel is a twin screw extruder.

9. The process of claim 1 further comprising the step of feeding at least one additive into said mixing vessel.

10. The process of claim 1 wherein the thermoplastic engineering resin is selected from the group consisting of polyamides, polyesters and mixtures thereof.

11. The process of claim 1 wherein said vulcanizing step is completed before said feeding said engineering resin and said feeding a compatibilizer forming material step.

12. The process of claim 11 further comprising the step of forming a compatibilizer from said compatibilizer forming material and said engineering resin.

13. The process of claim 12 further comprising the step of blending said dynamically vulcanized alloy, said engineering resin in the presence of said compatibilizer.

14. The process of claim 11 wherein before said vulcanizing step said mixing vessel contents comprises from about 10 to 50 parts by weight of said engineering resin.

15. A process for preparing a thermoplastic elastomer composition comprising the steps of:

feeding a thermoplastic olefinic polymer into a mixing vessel;

feeding an olefinic elastomer having reactive cure sites into said mixing vessel;

dynamically vulcanizing the contents of said mixing vessel to form a dynamically vulcanized alloy;

masticating the contents of said mixing vessel at a high shear rate during said vulcanizing step;

feeding an engineering resin into said mixing vessel;

forming a compatibilizer; and feeding a compatibilizer into said mixing vessel.

16. The process of claim 15 wherein said forming step comprises melt blending a compatibilizer forming material with said engineering resin.

17. The process of claim 15 wherein said feeding a compatibilizer step is performed after said dynamically vulcanizing step.

18. The process of claim 15 wherein said feeding a compatibilizer step is performed before said dynamically vulcanizing step.

19. The process of claim 16 wherein the ratio by weight of engineering resin to compatibilizer forming material ranges from about 95:5 to about 5:95.

20. The process of claim 19 wherein the ratio by weight of engineering resin to compatibilizer forming material is about 80:20.

21. The process of claim 17 wherein said compatibilizer forming material comprises a maleated olefinic polymer.

22. The process of claim 16 wherein said mixing vessel is a twin screw extruder.

23. The process of claim 16 further comprising the step of feeding at least one additive into said mixing vessel.

24. The process of claim 16 wherein the thermoplastic engineering resin is selected from the group consisting of polyamides, polyesters and mixtures thereof.

25. The process of claim 16 wherein said vulcanizing step is completed before said feeding said engineering resin, and said feeding a compatibilizer step.

26. The process of claim 25 wherein said forming a compatibilizer step is not performed in said mixing vessel.

27. The process of claim 25 further comprising the step of blending said dynamically vulcanized alloy, and said engineering resin in the presence of said compatibilizer.

28. The process of claim 16 wherein the contents of said mixing vessel after said feeding said engineering resin step comprises from about 10 to 50 parts by weight of said engineering resin.

29. The process of claim 16 wherein the contents of said mixing vessel after said feeding said engineering resin step comprises from about 90 to about 50 parts of said dynamically vulcanized alloy.

30. A process for preparing a thermoplastic elastomer composition comprising the steps of:

feeding a thermoplastic olefinic polymer into a first mixing vessel;

feeding a olefinic elastomer having reactive cure sites into said first mixing vessel;

dynamically vulcanizing the contents of said first mixing vessel to form a dynamically vulcanized alloy;

masticating the contents of said first mixing vessel at a high shear rate during said vulcanizing step;

feeding an engineering resin into a second mixing vessel;

forming a compatibilizer from a compatibilizer forming material and said engineering resin;

blending said engineering resin and said dynamically vulcanized alloy in the presence of said compatibilizer in said second mixing vessel.

31. The process of claim 30 wherein said first mixing vessel is a first portion of a twin screw extruder, and wherein said second mixing vessel is a second portion of said twin screw extruder wherein said first part feeds said second part and is in fluid communication therewith.

32. The process of claim 30 wherein said second mixing vessel comprises a twin screw extruder, further comprising the steps of removing said dynamically vulcanized alloy from said first mixing vessel and feeding said dynamically vulcanized alloy into an inlet of said second mixing vessel.

33. The process of claim 32 wherein said first mixing vessel comprises a twin screw extruder, wherein said first mixing vessel comprises an first inlet at a first end, and an outlet at a second end, wherein said first mixing vessel further comprises a means of continuously moving the contents of said twin screw extruder downstream from said first end towards said second end, wherein in said removing said dynamically vulcanized alloy from said first mixing vessel step said dynamically vulcanized alloy is removed from said outlet.

34. The process of claim 33 further comprising the steps of: feeding compatibilizer forming material into said inlet of said second mixing vessel, wherein in said compatibilizer forming step said compatibilizer is formed by the melt blending of said compatibilizer forming material and said engineering resin in said second mixing vessel.

35. The process of claim 33 wherein said compatibilizer forming step is performed in a third mixing vessel, further comprising the step of feeding said compatibilizer into said second mixing vessel.

36. A process for preparing a thermoplastic elastomer composition within a mixing vessel comprising the steps of:
feeding a mixture into said mixing vessel comprising:
(a) from about 10 to about 50 parts by weight of a thermoplastic engineering resin;
(b) from about 90 to about 50 parts by weight of alloy mixture comprising:
(i) a thermoplastic olefinic polymer;
(ii) an elastomeric copolymer having reactive cure sites;
feeding a compatibilizer forming material into said mixing vessel;
forming a compatibilizer within said mixing vessel from said compatibilizer forming material and said thermoplastic engineering resin;
dynamically vulcanizing said alloy mixture;
masticating the contents of said mixing vessel during said vulcanizing step.

37. The process of claim 36 wherein said feeding a compatibilizer forming material step is performed after said vulcanizing step.

38. The process of claim 36 wherein said feeding a compatibilizer forming material step is performed before said vulcanizing step.

* * * * *